United States Patent
Ura et al.

(10) Patent No.: US 11,079,647 B2
(45) Date of Patent: Aug. 3, 2021

(54) ELECTROCHROMIC DISPLAY ELEMENT, OPTICAL FILTER, LENS UNIT, AND IMAGING DEVICE

(71) Applicants: Naoki Ura, Kanagawa (JP); Fuminari Kaneko, Kanagawa (JP)

(72) Inventors: Naoki Ura, Kanagawa (JP); Fuminari Kaneko, Kanagawa (JP)

(73) Assignee: Ricoh Company, Ltd., Tokyo (JP)

(\*) Notice: Subject to any disclaimer, the term of this patent is extended or adjusted under 35 U.S.C. 154(b) by 258 days.

(21) Appl. No.: 16/358,119

(22) Filed: Mar. 19, 2019

(65) Prior Publication Data
US 2019/0294015 A1 Sep. 26, 2019

(30) Foreign Application Priority Data

Mar. 22, 2018 (JP) .............................. JP2018-054990
Mar. 18, 2019 (JP) .............................. JP2019-049885

(51) Int. Cl.
*G02F 1/155* (2006.01)
*G02F 1/1516* (2019.01)
*C09K 9/02* (2006.01)
*G02F 1/1514* (2019.01)

(52) U.S. Cl.
CPC .............. *G02F 1/1516* (2019.01); *C09K 9/02* (2013.01); *G02F 1/155* (2013.01); *C09K 2211/1007* (2013.01); *C09K 2211/1014* (2013.01); *C09K 2211/1018* (2013.01); *G02F 2001/15145* (2019.01)

(58) Field of Classification Search
CPC .............. C09K 9/02; C09K 2211/1007; C09K 2211/1014; C09K 2211/1018; G02F 1/155; G02F 1/1516; G02F 2001/15145; G02F 1/1503; G03B 9/00; G03B 11/00
See application file for complete search history.

(56) References Cited

U.S. PATENT DOCUMENTS

| | | | |
|---|---|---|---|
| 4,902,108 A | 2/1990 | Byker | |
| 2005/0259986 A1\* | 11/2005 | Kaneiwa | ............... G02F 1/1503 396/506 |
| 2009/0128882 A1\* | 5/2009 | Das | .......................... C09K 9/02 359/265 |
| 2012/0330025 A1\* | 12/2012 | Osaka | ................. H01L 51/0061 548/219 |
| 2016/0209721 A1 | 7/2016 | Matsumoto et al. | |

(Continued)

FOREIGN PATENT DOCUMENTS

| | | |
|---|---|---|
| JP | 62-294225 | 12/1987 |
| JP | 2017-021327 | 1/2017 |

(Continued)

*Primary Examiner* — Balram T Parbadia
(74) *Attorney, Agent, or Firm* — Oblon, McClelland, Maier & Neustadt, L.L.P.

(57) ABSTRACT

An electrochromic display element is provided. The electrochromic display element includes a pair of electrodes and an electrochromic layer disposed between the electrodes. The electrochromic layer contains a solvent, a supporting electrolyte, an anodic electrochromic molecule comprising a triarylamine derivative, and a cathodic electrochromic molecule comprising a viologen derivative. Concentrations of the triarylamine derivative and the viologen derivative in the electrochromic layer are each 4 mM or more.

12 Claims, 1 Drawing Sheet

(56) References Cited

U.S. PATENT DOCUMENTS

| | | | |
|---|---|---|---|
| 2016/0299401 A1* | 10/2016 | Kubo | G02F 1/1503 |
| 2017/0010514 A1 | 1/2017 | Yashiro et al. | |
| 2017/0168366 A1 | 6/2017 | Shinoda et al. | |
| 2017/0235202 A1* | 8/2017 | Kubo | G02F 1/1503 |
| | | | 359/266 |
| 2017/0329197 A1 | 11/2017 | Yashiro et al. | |
| 2017/0329198 A1 | 11/2017 | Matsuoka et al. | |
| 2018/0044581 A1 | 2/2018 | Sagisaka et al. | |
| 2018/0113366 A1 | 4/2018 | Kaneko et al. | |
| 2018/0173070 A1 | 6/2018 | Yamamoto et al. | |
| 2018/0208834 A1 | 7/2018 | Goto et al. | |
| 2018/0314125 A1 | 11/2018 | Goto et al. | |
| 2019/0265569 A1* | 8/2019 | Miyazaki | G02F 1/157 |

FOREIGN PATENT DOCUMENTS

| | | |
|---|---|---|
| JP | 2017-107153 | 6/2017 |
| JP | 2018-118933 | 8/2018 |

* cited by examiner

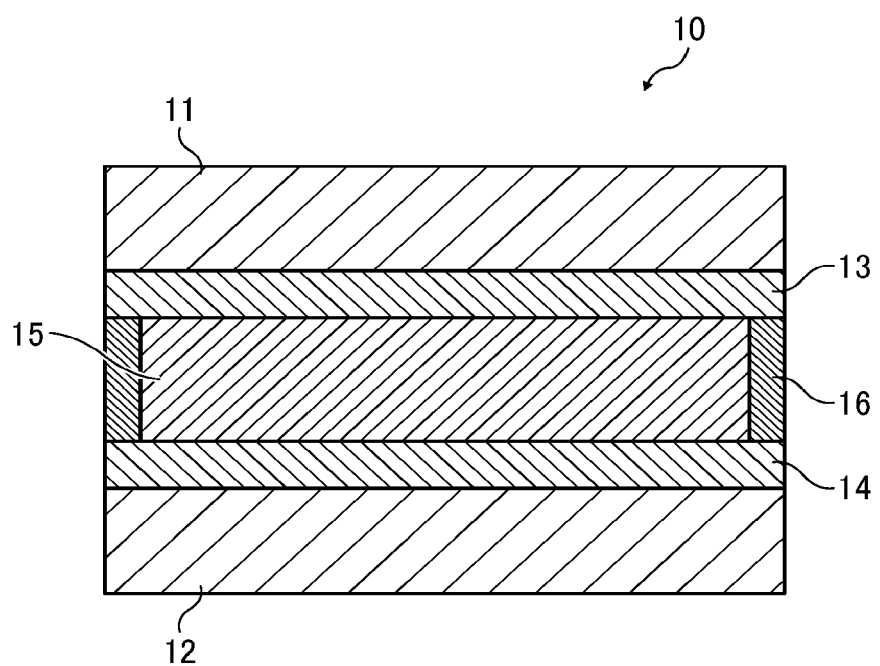

ELECTROCHROMIC DISPLAY ELEMENT, OPTICAL FILTER, LENS UNIT, AND IMAGING DEVICE

CROSS-REFERENCE TO RELATED APPLICATIONS

This patent application is based on and claims priority pursuant to 35 U.S.C. § 119(a) to Japanese Patent Application Nos. 2018-054990 and 2019-049885, filed on Mar. 22, 2018 and Mar. 18, 2019, respectively, in the Japan Patent Office, the entire disclosure of each of which is hereby incorporated by reference herein.

BACKGROUND

Technical Field

The present disclosure relates to an electrochromic display element, an optical filter, a lens unit, and an imaging device.

Description of the Related Art

Electrochromism is a phenomenon in which color changes as a redox reaction reversibly occurs in response to application of voltage, and has been extensively researched and developed for applications such as dimming and signage. An electrochromic display element utilizing electrochromism is generally provided with an ion-conducting electrolyte layer between two opposed electrodes. A redox reaction occurs as a voltage is applied to between the electrodes. When a reduction reaction occurs in the vicinity of one of the two opposed electrodes, an oxidation reaction that is the reverse reaction occurs in the vicinity of the other electrode.

An electrochromic material exhibiting electrochromism can be improved in responsiveness and memory property when fixed in the vicinity of the electrode, however, the element structure becomes complicated and the cost is increased. On the other hand, the electrochromic display element in which the electrochromic material is dissolved in the electrolyte layer is poor in responsiveness but is simple in device structure, so that cost reduction can be expected. For example, an electrochromic display element in which a viologen derivative and phenazine are dissolved in an electrolyte has been proposed.

As anodic electrochromic molecules, triarylamine derivatives are attracting attention as useful materials because of their excellent durability and easy control of their color and potential. As an example, a three-layered electrochromic display element having an oxidization layer comprising triarylamine has been proposed. As another example, proposed in attempting to improve durability and light durability, an electrochromic compound having a triarylamine backbone has been.

SUMMARY

In accordance with some embodiment of the present invention, an electrochromic display element is provided. The electrochromic display element includes a pair of electrodes and an electrochromic layer disposed between the electrodes. The electrochromic layer contains a solvent, a supporting electrolyte, an anodic electrochromic molecule comprising a triarylamine derivative, and a cathodic electrochromic molecule comprising a viologen derivative. Concentrations of the triarylamine derivative and the viologen derivative in the electrochromic layer are each 4 mM or more.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawing, which is intended to depict example embodiments of the present invention and should not be interpreted to limit the scope thereof. The accompanying drawing is not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In the present disclosure, the unit [mM] for concentration refers to the molar concentration [mmol/L] per one liter of volume.

The viologen derivative, which is a cathodic electrochromic molecule having a low redox potential and high durability, has hydrophilicity, while the triarylamine derivative has highly hydrophobicity. For this reason, it is difficult to find an organic solvent capable of simultaneously dissolving the viologen derivative and the triarylamine derivative at high concentrations, and an electrochromic display element in which these electrochromic molecules are dissolved in the electrolyte layer has not been obtained so far. There has been an attempt to dissolve each of the triarylamine derivative and the viologen derivative separately in propylene carbonate at a concentration of 0.5 mM and obtain a composite absorption spectrum by adding the absorption spectrum upon application of a voltage of each compound. However, an electrochromic display element using a solution obtained by simultaneously dissolving the triarylamine derivative and the viologen derivative has not been proposed.

The present invention has been made in view of the above-described conventional problems. One embodiment of the present invention provides an electrochromic display element that exhibits good coloring/decoloring property at low cost, in which a viologen derivative and a triarylamine derivative are simultaneously dissolved in an electrolyte layer at high concentrations. Here, the "coloring/decoloring property" of the electrochromic display element refers to a property of undergoing a color change which can be visually recognized upon application of a coloring voltage and returning to the original color upon application of a decoloring voltage.

According to an embodiment of the present invention, an electrochromic display element exhibiting good coloring property is provided at low cost.

An electrochromic display element according to an embodiment of the present invention is described below with reference to the drawing.

In an electrochromic display element 10, a display electrode (first electrode) 13 formed on a substrate 11 and a counter electrode (second electrode) 14 formed on a support 12 are opposed to each other with a spacer 16 interposed therebetween, and an electrochromic layer 15 is disposed between both electrodes (i.e., the display electrode 13 and the counter electrode 14).

The electrochromic layer 15 contains at least a solvent, a supporting electrolyte, an anodic electrochromic molecule, and a cathodic electrochromic molecule. The anodic electrochromic molecule comprises a triarylamine derivative, and the cathodic electrochromic molecule comprises a viologen derivative.

Anodic Electrochromic Molecule

The anodic electrochromic molecule according to an embodiment of the present invention comprises a triarylamine derivative. Examples of the triarylamine derivative include a compound represented by the following general formula (1).

$$A_n\text{-}B_m \quad \text{General Formula (1)}$$

In the general formula (1), when n is 2, m is 0; and when n is 1, m is 0 or 1. A is represented by the following general formula (2) and bonded with B at any position of $R_1$ to $R_{15}$. B is represented by the following general formula (3) and bonded with A at any position of $R_{16}$ to $R_{21}$.

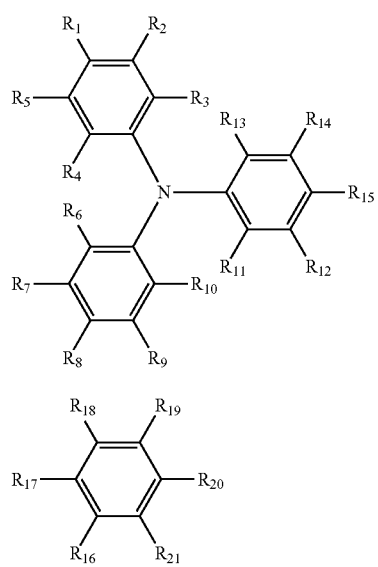

General Formula (2)

General Formula (3)

In the formulae (2) and (3), each of $R_1$ to $R_{21}$ independently represents a monovalent group.

Monovalent Group

Specific examples of the monovalent group in the above formulae (2) and (3) include, but are not limited to, a hydrogen atom, a halogen atom, hydroxyl group, nitro group, cyano group, carboxyl group, a substituted or unsubstituted alkoxycarbonyl group, a substituted or unsubstituted aryloxycarbonyl group, a substituted or unsubstituted alkylcarbonyl group, a substituted or unsubstituted arylcarbonyl group, amide group, a substituted or unsubstituted monoalkylaminocarbonyl group, a substituted or unsubstituted dialkylaminocarbonyl group, a substituted or unsubstituted monoarylaminocarbonyl group, a substituted or unsubstituted diarylaminocarbonyl group, sulfonic acid group, a substituted or unsubstituted alkoxysulfonyl group, a substituted or unsubstituted aryloxysulfonyl group, a substituted or unsubstituted alkylsulfonyl group, a substituted or unsubstituted arylsulfonyl group, sulfoneamide group, a substituted or unsubstituted monoalkylaminosulfonyl group, a substituted or unsubstituted dialkylaminosulfonyl group, a substituted or unsubstituted monoarylaminosulfonyl group, a substituted or unsubstituted diarylaminosulfonyl group, amino group, a substituted or unsubstituted monoalkylamino group, a substituted or unsubstituted dialkylamino group, a substituted or unsubstituted alkyl group, a substituted or unsubstituted alkenyl group, a substituted or unsubstituted alkynyl group, a substituted or unsubstituted aryl group, a substituted or unsubstituted alkoxy group, a substituted or unsubstituted aryloxy group, a substituted or unsubstituted alkylthio group, a substituted or unsubstituted arylthio group, and a substituted or unsubstituted heterocyclic group.

Specific examples of the halogen atom include, but are not limited to, fluorine atom, chlorine atom, bromine atom, and iodine atom.

Specific examples of the alkyl group include, but are not limited to, methyl group, ethyl group, propyl group, and butyl group.

Specific examples of the aryl group include, but are not limited to, phenyl group, naphthyl group, anthryl group, and phenanthryl group.

Specific examples of the aralkyl group include, but are not limited to, benzyl group, phenethyl group, and naphthylmethyl group.

Specific examples of the alkoxy group include, but are not limited to, methoxy group, ethoxy group, and propoxy group.

Specific examples of the aryloxy group include, but are not limited to, phenoxy group, 1-naphthyloxy group, 2-naphthyloxy group, 4-methoxyphenoxy group, and 4-methylphenoxy group.

Specific examples of the heterocyclic group include, but are not limited to, carbazole, dibenzofuran, dibenzothiophene, oxadiazole, and thiadiazole.

The substituent may be further substituted with a substituent, such as a halogen atom, nitro group, cyano group, an alkyl group (e.g., methyl group, ethyl group), an alkoxy group (e.g., methoxy group, ethoxy group), an aryloxy group (e.g., phenoxy group), an aryl group (e.g., phenyl group, naphthyl group), and an aralkyl group (e.g., benzyl group, phenethyl group).

Preferably, the triarylamine derivative represented by the general formula (1) is a benzidine derivative represented by the following general formula (4).

General Formula (4)

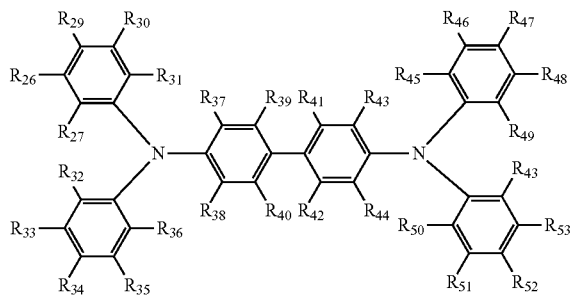

General Formula (7)

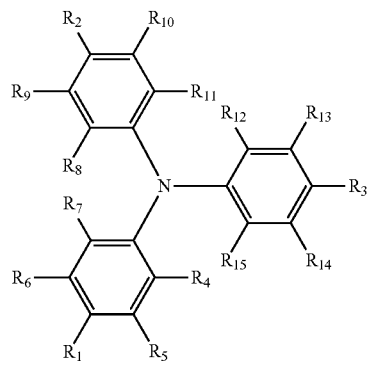

In the general formula (4), each of $R_{27}$ to $R_{54}$ independently represents a monovalent group. Specific examples of the monovalent group include those illustrated for the general formulas (2) and (3). The compound represented by the general formula (4) is more durable and easier to control the color and potential than the compound represented by the general formula (1).

More preferably, the benzidine derivative represented by the general formula (4) is a compound represented by the following general formula (6).

General Formula (6)

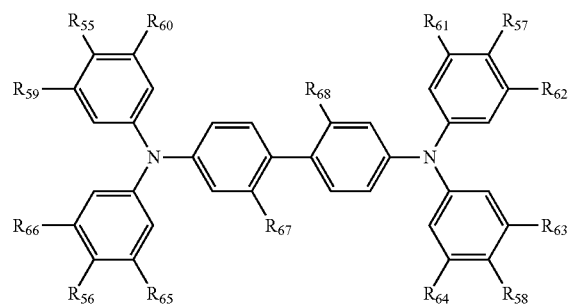

where each of $R_{55}$ to $R_{58}$ independently represents a halogen atom, an alkyl group, an alkoxy group, or a phenyl ether group; each of $R_{59}$ to $R_{66}$ independently represents a hydrogen atom, an alkyl group, or an alkoxy group; and each of $R_{67}$ and $R_{68}$ independently represents a hydrogen atom, a halogen atom, an alkyl group, or an alkoxy group, or $R_{67}$ and $R_{68}$ may be bonded with each other to form the following structure when each of $R_{67}$ and $R_{68}$ represents an alkyl group:

where each of $R_1$ and $R_2$ independently represents an alkyl group or an aryl group.

Preferably, the triarylamine derivative represented by the general formula (1) is a triphenylamine derivative represented by the following general formula (7).

where each of $R_1$ to $R_3$ independently represents at least one member selected from the group consisting of a halogen atom, an alkyl group, an alkoxy group, a group in which an aryl group and a heterocyclic group are bonded via a covalent bond, and a group in which an aryl group and a heterocyclic group are ring-condensed; and each of $R_4$ to $R_{15}$ independently represents at least one member selected from the group consisting of a hydrogen atom, a halogen atom, an alkyl group, an alkoxy group, a group in which an aryl group and a heterocyclic group are bonded via a covalent bond, and a group in which an aryl group and a heterocyclic group are ring-condensed.

Preferably, the group in which an aryl group and a heterocyclic group are bonded via a covalent bond or the group in which an aryl group and a heterocyclic group are ring-condensed represents a group obtained by removing a hydrogen atom from an arbitrary carbon atom on an outer edge of a molecule of one of the following compounds. This is because the triplet energy of the group in which an aryl group and a heterocyclic group are bonded via a covalent bond or the group in which an aryl group and a heterocyclic group are ring-condensed is relatively smaller than the triplet energy of a triphenylamine monomer (for example, 3.0 eV).

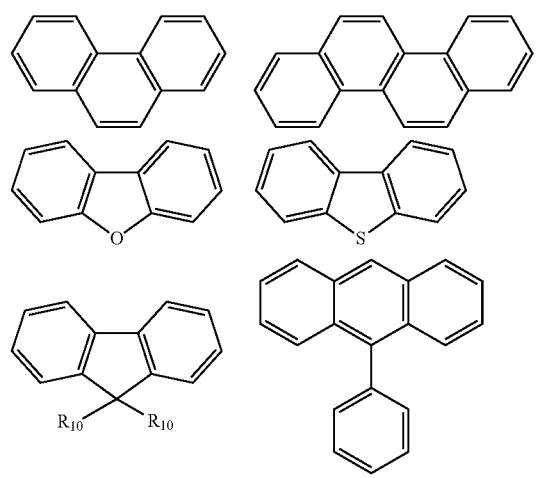

-continued

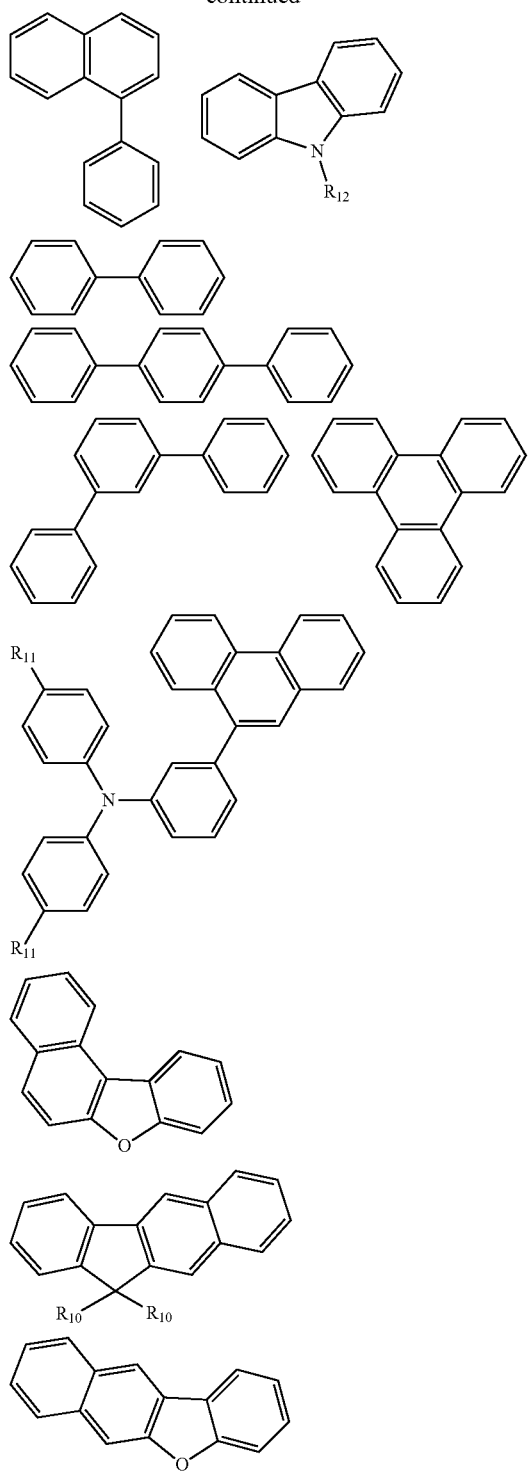

In the above formulae, each of $R_{10}$ and $R_{12}$ independently represents an alkyl group or an aryl group and $R_{11}$ represents an alkyl group, an alkenyl group, or an alkoxy group.

Specific examples of the compounds represented by the formula (1), (4), (6), or (7) include the following example compounds, but are not limited thereto.

The anodic electrochromic molecule is not limited to these compounds.

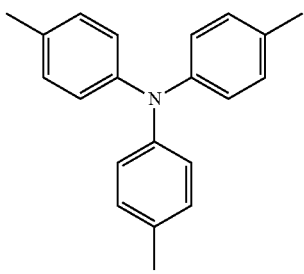

Example Compound (1)

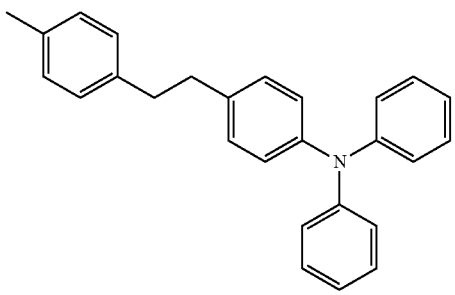

Example Compound (2)

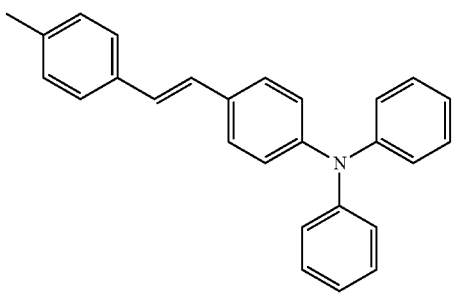

Example Compound (3)

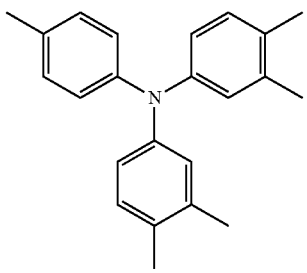

Example Compound (4)

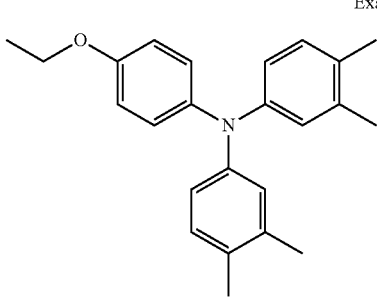

Example Compound (5)

Example Compound (6)

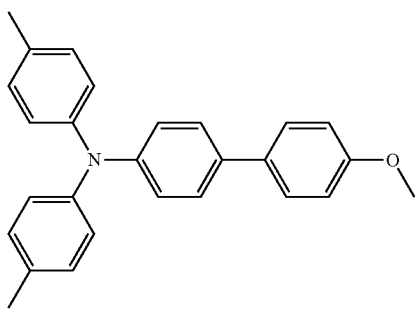

Example Compound (7)

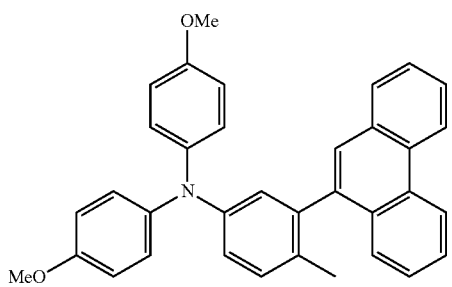

Example Compound (8)

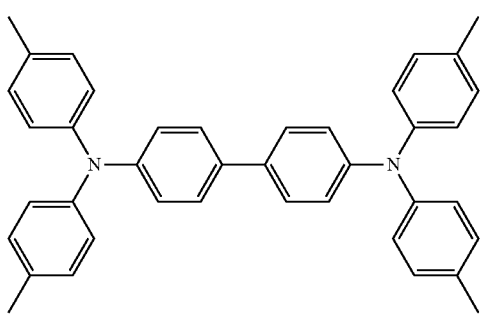

Example Compound (9)

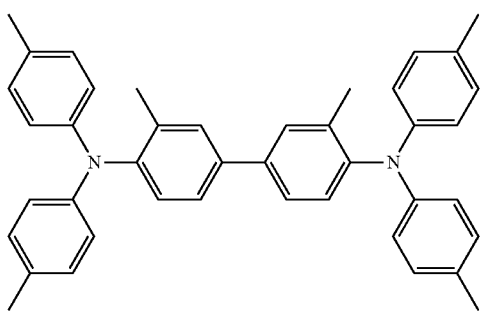

Example Compound (10)

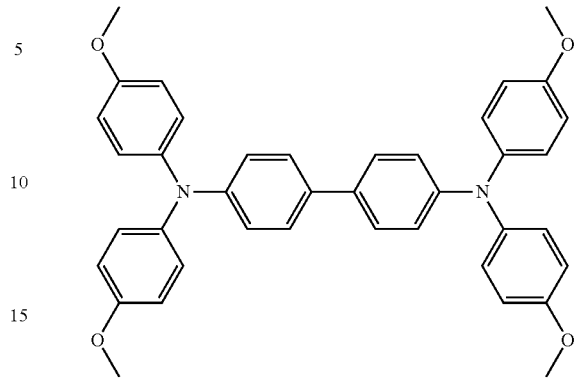

Example Compound (11)

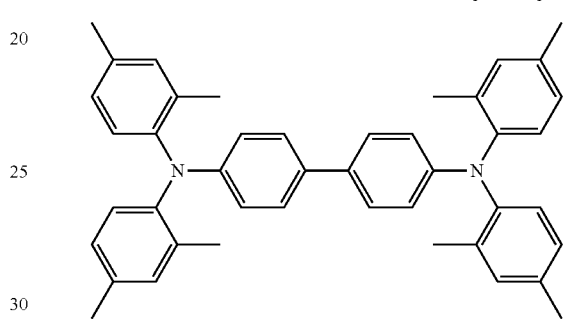

Cathodic Electrochromic Molecule

The cathodic electrochromic molecule according to an embodiment of the present invention comprises a viologen derivative represented by the following general formula (5).

General Formula (5)

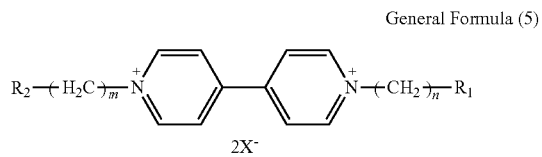

In the general formula (5), each of $R_1$ and $R_2$ independently represents an alkyl or aryl group having 1 to 10 carbon atoms which may have a substituent, each of n and m independently represents 0 or an integer of from 1 to 10, and X represents a monovalent anion.

Specific examples of the monovalent anion include, but are not limited to, Br ion (Br$^-$), Cl ion (Cl$^-$), ClO$_4$ ion (ClO$_4^-$), PF$_6$ ion (PF$_6^-$), BF$_4$ ion (BF$_4^-$), CF$_3$SO$_3$ ion (OTf$^-$), (FSO$_2$)$_2$N ion (FSI$^-$), (CF$_3$SO$_2$)$_2$N ion (TFSI$^-$), and B(CN)$_4$ ion (TCB$^-$).

Preferably, the monovalent anion is ClO$_4$ ion, PF$_6$ ion, BF$_4$ ion, CF$_3$SO$_3$ ion, (FSO$_2$)$_2$N ion, (CF$_3$SO$_2$)$_2$N ion, or B(CN)$_4$ ion. These anions are highly hydrophobic, and viologen derivatives using these anions have high solubility in organic solvents.

Specific examples of the compound represented by the formula (5) include the following example compounds, but are not limited thereto. The cathodic electrochromic molecule is not limited to these compounds.

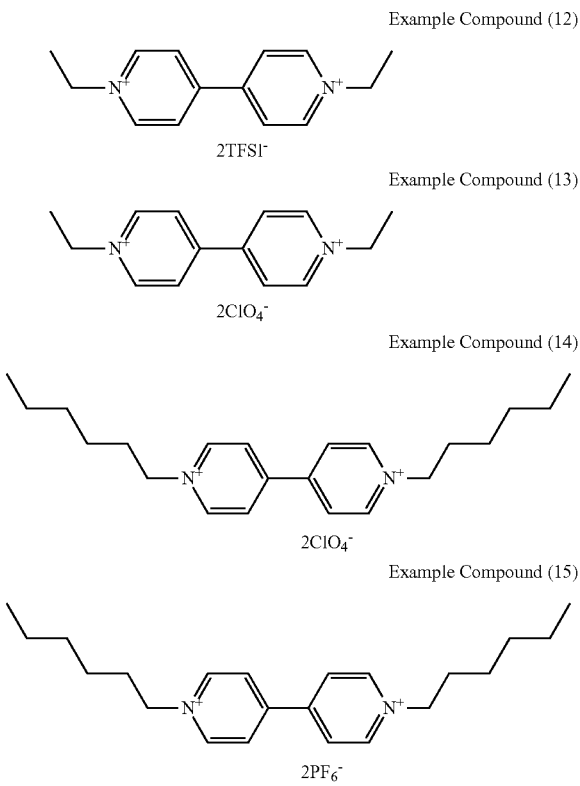

Example Compound (12) — 2TFSI⁻
Example Compound (13) — 2ClO₄⁻
Example Compound (14) — 2ClO₄⁻
Example Compound (15) — 2PF₆⁻

In the Examples described later, ethyl viologen dibistrifluoromethanesulfonylimide (EV-2TFSI) and ethyl viologen diperchlorate (EV-2ClO$_4$) were used as the viologen derivatives.

Solvent

The solvent according to an embodiment of the present invention is capable of dissolving both the triarylamine derivative and the viologen derivative at a concentration of 4 mM. The electrochromic display element having an electrochromic layer in which both the triarylamine derivative and the viologen derivative are dissolved at a concentration of 4 mM or more exhibits good coloring property.

Preferably, the solvent according to an embodiment of the present invention is capable of dissolving both the triarylamine derivative and the viologen derivative at a concentration of 8 mM. More preferably, the solvent according to an embodiment of the present invention is capable of dissolving both the triarylamine derivative and the viologen derivative at a concentration of 11 mM.

The solvent according to an embodiment of the present invention preferably comprises a benzonitrile derivative. Benzonitrile derivatives are excellent in terms of low viscosity, low volatility, inexpensiveness, and electrochemical stability.

Examples of the benzonitrile derivative include, but are not limited to, benzonitrile, 4-methylbenzonitrile, and phenylacetonitrile. These compounds may be used alone or in combination with others.

Supporting Electrolyte

The supporting electrolyte according to an embodiment of the present invention is not particularly limited and any known electrolyte can be used.

Examples of the supporting electrolyte include, but are not limited to: inorganic ion salts such as alkali metal salts and alkali-earth metal salts; quaternary ammonium salts; and supporting salts of acids and bases. Specific examples thereof include, but are not limited to, LiClO$_4$, LiBF$_4$, LiAsF$_6$, LiPF$_6$, LiCF$_3$SO$_3$, LiCF$_3$COO, KCl, NaClO$_4$, NaCl, NaBF$_4$, NaSCN, KBF$_4$, Mg(ClO$_4$)$_2$, and Mg(BF$_4$)$_2$, (CH$_3$)$_4$NClO$_4$, (CH$_3$CH$_2$)$_4$NClO$_4$, and (CH$_3$(CH$_2$)$_3$)$_4$NClO$_4$.

As the material of the supporting electrolyte, an ionic liquid may also be used. In particular, an organic ionic liquid is preferable for its molecular structure that exhibits liquidity in a wide temperature range including room temperature. By using an ionic liquid, good solubility is provided.

The cationic component in the ionic liquid may be, for example, an imidazole derivative (e.g., N,N-dimethylimidazolium salt, N,N-methylethylimidazolium salt, N,N-methylpropylimidazolium salt, N,N-methylbutylimidazolium salt, N,N-ethylbutylimidazolium salt, and N,N-ethylhexylimidazolium salt), a pyridinium derivative (e.g., N,N-dimethylpyridinium salt and N,N-methylpropylpyridinium salt), or an aliphatic quaternary ammonium salt (e.g., trimethylpropylammonium salt, trimethylhexylammonium salt, and triethylhexylammonium salt).

The anionic component may be, for example, BF$_4$⁻, OTf⁻, PF$_6$⁻, FSI⁻, TFSI⁻, and TCB⁻.

As the material of the supporting electrolyte, an ionic liquid in which the above-described cationic component and anion component are arbitrarily combined is preferably used.

In the Examples described later, 1-hexyl-3-methylimidazolium bistrifluoromethanesulfonylimide (HMIMTF SI) and 1-ethyl-3-methylimidazolium tetracyanoborate (EMIMTCB) were used as the ionic liquids.

Electrode

The material of the first electrode and the second electrode is not particularly limited and can be appropriately selected according to the purpose as long as it is a transparent material having conductivity. Examples of such a material include, but are not limited to, inorganic materials such as tin-doped indium oxide (ITO), fluorine-doped tin oxide (FTO), antimony-doped tin oxide (ATO), and zinc oxide. Among these, InSnO, GaZnO, SnO, In$_2$O$_3$, and ZnO are preferable.

Alternatively, an electrode having improved conductivity while maintaining transparency may be used, formed of a fine network structure of transparent carbon nanotube or other highly-conductive non-transmissive materials such as Au, Ag, Pt, and Cu.

The thicknesses of the first electrode and the second electrode are so adjusted that these electrodes have proper electrical resistance values required for causing a redox reaction in the electrochromic layer.

For example, when the first electrode and the second electrode are made of ITO, the thicknesses thereof are preferably in the range of from 50 to 500 nm.

Other Components

Gelling Agent

The electrochromic layer according to an embodiment of the present invention may further contain a gelling agent, as necessary.

The electrochromic layer need not necessarily be a low-viscosity liquid and may be in the form of a gel, cross-linked polymer, or liquid crystal dispersion.

The electrolyte in the form of a gel or solid is advantageous for improving strength and reliability of the element.

As the gelling agent, various known ones can be used.

Sealant

Known sealants can be used as long as they are not affected by the solvent.

Electrochromic Display Element

The average thickness of the electrochromic layer is not particularly limited and may be appropriately selected according to the purpose, but is preferably from 10 to 500 μm for good coloring property.

Use Application

The electrochromic display element of the present embodiment can be used for an optical filter, a lens unit, and an imaging device. Specifically, by providing the electrochromic display element in an optical path of an imaging optical system connected to an image sensor, the amount of light received by the image sensor or the wavelength distribution characteristics of the incident light can be controlled. This imaging optical system may also be referred to as a lens system. Examples of the imaging optical system include, but are not limited to, a lens unit having a plurality of lenses.

In addition, the electrochromic display element of the present embodiment functions as an electrically-controlled optical filter by being connected to an active element or the like. Examples of the active element include, but are not limited to, a transistor such as a TFT (thin film transistor) element, and an MIM (metal insulator metal) element.

Here, the imaging device refers to a device having an image sensor, and an imaging optical system having an optical filter. When the electrochromic display element of the present embodiment is used in the imaging device, the disposition of the electrochromic display device is not limited. For example, it may be disposed in front of the imaging optical system or just in front of the image sensor.

The electrochromic display element in a decolored state exhibits high transparency and transmits a sufficient amount of incident light. The electrochromic display element in a colored state exhibits optical characteristics in which incident light is reliably shielded and modulated.

EXAMPLES

The embodiments of the present invention are further described in detail with reference to the Examples but is not limited to the following Examples.

Triarylamine derivatives, viologen derivatives, and Mixed Solvents 1 to 4 used in the Examples are as described below.

Triaryl amine Derivatives

Triarylamine derivatives serving as the anodic electrochromic molecules used in the Examples are as follows.

Compound B: Compound represented by the following structural formula (1)

Compound C: Compound represented by the following structural formula (3)

Compound D: Compound represented by the following structural formula (2)

Viologen Derivatives

Viologen derivatives serving as the cathodic electrochromic molecules used in the Examples are as follows.

Compound A: Compound represented by the following structural formula (4)

Compound E: Compound represented by the following structural formula (5)

Mixed Solvents

Mixed Solvent 1: Mixture of benzonitrile (PhCN) and propylene carbonate (PC) at a volume ratio of 1:1

Mixed Solvent 2: Mixture of benzonitrile (PhCN) and dimethylsulfoxide (DMSO) at a volume ratio of 1:1

Mixed Solvent 3: Mixture of benzonitrile (PhCN) and acetonitrile (AN) at a volume ratio of 1:1

Mixed Solvent 4: Mixture of dibutyl adipate and sulfolane at a volume ratio of 1.3:1

(Compound A)

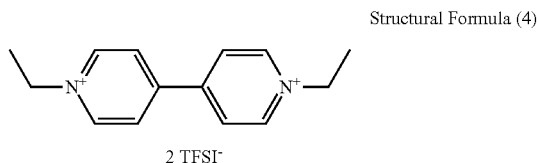

Structural Formula (4)

(Compound B)

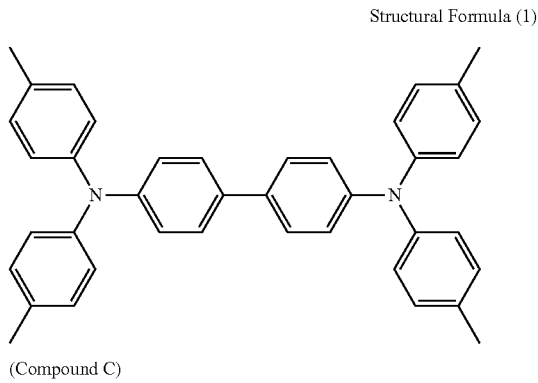

Structural Formula (1)

(Compound C)

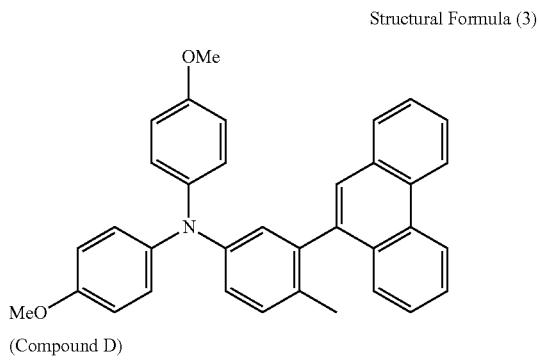

Structural Formula (3)

(Compound D)

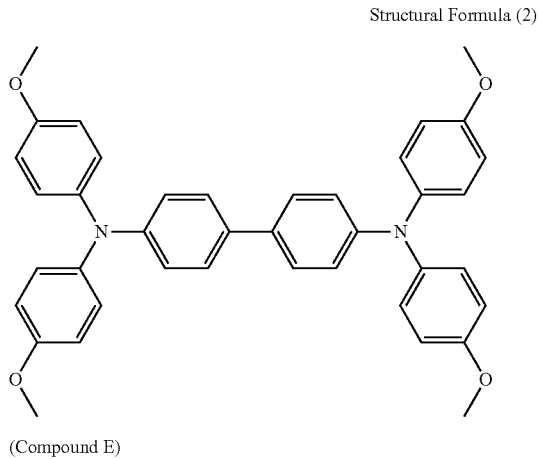

Structural Formula (2)

(Compound E)

-continued

Structural Formula (5)

$$\text{CH}_3\text{CH}_2-\text{N}^+\text{C}_5\text{H}_4-\text{C}_5\text{H}_4-\text{N}^+-\text{CH}_2\text{CH}_3 \quad 2\,\text{ClO}_4^-$$

Example 1

Preparation of Electrochromic Solution

In benzonitrile (PhCN, manufactured by Tokyo Chemical Industry Co., Ltd.), 1-hexyl-3-methylimidazolium bistrifluoromethanesulfonylimide (HMIMTFSI, manufactured by Iolitec Ionic Liquids Technologies GmbH), N,N,N',N'-tetrakis(p-tolyl)benzidine (NTTB, manufactured by Tokyo Chemical Industry Co., Ltd.) as Compound B, and ethyl viologen dibistrifluoromethanesulfonylimide (EV-2TFSI) as Compound A were dissolved at concentrations of 400 mM, 15 mM, and 15 mM, respectively. Thus, an electrochromic solution (hereinafter "EC solution") was prepared.

Preparation of Electrochromic Display Element

A 100-micron spacer was interposed between ITO glass substrates (having an area of 40 mm×40 mm, a thickness of 0.7 mm, and an ITO film thickness of about 100 nm) as a pair of electrodes, and the outer periphery of the substrates excluding one side was sealed with a sealant to prepare an empty cell. The EC solution was injected in the empty cell from the unsealed side, and the unsealed side was then sealed. Thus, an electrochromic display element (hereinafter "EC element") was prepared.

Color Change Test of Electrochromic Display Element

The responsiveness to coloring of the produced EC display element was evaluated. Specifically, a change in the average absorbance in the visible range (380 to 780 nm) upon application of a voltage of −1.6 V to between the pair of electrodes was measured. The responsiveness to coloring was evaluated by the change in the average absorbance after 10 seconds from the start of voltage application based on the following criteria. S: 0.5 or more A: less than 0.5 and not less than 0.2 B: less than 0.2 and not less than 0.1 C: less than 0.1 The results are shown in Table 1.

Example 2

Preparation of Electrochromic Solution

In PhCN, HMIMTFSI, Compound A, and Compound B were dissolved at concentrations of 400 mM, 14 mM, and 14 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change Test of Electrochromic Display Element

The responsiveness to coloring of the produced EC display element was evaluated in the same manner as in Example 1.

Example 3

Preparation of Electrochromic Solution

In PhCN, HMIMTFSI, Compound A, and Compound B were dissolved at concentrations of 400 mM, 13 mM, and 13 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change Test of Electrochromic Display Element

The responsiveness to coloring of the produced EC display element was evaluated in the same manner as in Example 1.

Example 4

Preparation of Electrochromic Solution

In PhCN, HMIMTFSI, Compound A, and Compound B were dissolved at concentrations of 400 mM, 12 mM, and 12 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change Test of Electrochromic Display Element

The responsiveness to coloring of the produced EC display element was evaluated in the same manner as in Example 1.

Example 5

Preparation of Electrochromic Solution

In PhCN, HMIMTFSI, Compound A, and Compound B were dissolved at concentrations of 400 mM, 11 mM, and 11 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change Test of Electrochromic Display Element

The responsiveness to coloring of the produced EC display element was evaluated in the same manner as in Example 1.

Example 6

Preparation of Electrochromic Solution

In PhCN, HMIMTFSI, Compound A, and Compound B were dissolved at concentrations of 400 mM, 10 mM, and 10 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change Test of Electrochromic Display Element

The responsiveness to coloring of the produced EC display element was evaluated in the same manner as in Example 1.

Example 7

Preparation of Electrochromic Solution

In PhCN, HMIMTFSI, Compound A, and Compound B were dissolved at concentrations of 400 mM, 9 mM, and 9 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change Test of Electrochromic Display Element

The responsiveness to coloring of the produced EC display element was evaluated in the same manner as in Example 1.

Example 8

Preparation of Electrochromic Solution

In PhCN, HMIMTFSI, Compound A, and Compound B were dissolved at concentrations of 400 mM, 8 mM, and 8 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change Test of Electrochromic Display Element

The responsiveness to coloring of the produced EC display element was evaluated in the same manner as in Example 1.

Example 9

Preparation of Electrochromic Solution

In PhCN, HMIMTFSI, Compound A, and Compound B were dissolved at concentrations of 400 mM, 7 mM, and 7 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change Test of Electrochromic Display Element

The responsiveness to coloring of the produced EC display element was evaluated in the same manner as in Example 1.

Example 10

Preparation of Electrochromic Solution

In PhCN, HMIMTFSI, Compound A, and Compound B were dissolved at concentrations of 400 mM, 6 mM, and 6 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change Test of Electrochromic Display Element

The responsiveness to coloring of the produced EC display element was evaluated in the same manner as in Example 1.

Example 11

Preparation of Electrochromic Solution

In PhCN, HMIMTFSI, Compound A, and Compound B were dissolved at concentrations of 400 mM, 5 mM, and 5 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change Test of Electrochromic Display Element

The responsiveness to coloring of the produced EC display element was evaluated in the same manner as in Example 1.

Example 12

Preparation of Electrochromic Solution

In PhCN, HMIMTFSI, Compound A, and Compound B were dissolved at concentrations of 400 mM, 4 mM, and 4 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change Test of Electrochromic Display Element

The responsiveness to coloring of the produced EC display element was evaluated in the same manner as in Example 1.

Example 13

Preparation of Electrochromic Solution

In PhCN, tetra-n-butylammonium perchlorate (TBAP, manufactured by Tokyo Chemical Industry Co., Ltd.), Compound E, and Compound C were dissolved at concentrations of 50 mM, 11 mM, and 11 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change of Electrochromic Display Element

The responsiveness to coloring of the produced EC display element was evaluated in the same manner as in Example 1.

Example 14

Preparation of Electrochromic Solution

In PhCN, tetra-n-butylammonium perchlorate (TBAP, manufactured by Tokyo Chemical Industry Co., Ltd.), Compound E, and Compound C were dissolved at concentrations of 50 mM, 4 mM, and 4 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change of Electrochromic Display Element

The responsiveness to coloring of the produced EC display element was evaluated in the same manner as in Example 1.

Example 15

Preparation of Electrochromic Solution

In PhCN, HMIMTFSI, Compound A, and Compound D were dissolved at concentrations of 50 mM, 11 mM, and 11 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change of Electrochromic Display Element

The responsiveness to coloring of the produced EC display element was evaluated in the same manner as in Example 1.

Example 16

Preparation of Electrochromic Solution

In N,N-dimethylacetamide (DMA, manufactured by Tokyo Chemical Industry Co., Ltd.), HMIMTFSI, Compound A, and Compound B were dissolved at concentrations of 50 mM, 8 mM, and 8 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change of Electrochromic Display Element

The responsiveness to coloring of the produced EC display element was evaluated in the same manner as in Example 1.

Example 17

Preparation of Electrochromic Solution

In N-methylpyrrolidone (NMP, manufactured by Tokyo Chemical Industry Co., Ltd.), HMIMTFSI, Compound E, and Compound C were dissolved at concentrations of 50 mM, 11 mM, and 11 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change of Electrochromic Display Element

The responsiveness to coloring of the produced EC display element was evaluated in the same manner as in Example 1.

Example 18

Preparation of Electrochromic Solution

In NMP, HMIMTFSI, Compound E, and Compound D were dissolved at concentrations of 50 mM, 11 mM, and 11 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change of Electrochromic Display Element

The responsiveness to coloring of the produced EC display element was evaluated in the same manner as in Example 1.

Example 19

Preparation of Electrochromic Solution

In cyclohexanone (CHN, manufactured by Tokyo Chemical Industry Co., Ltd.), TBAP, Compound A, and Compound C were dissolved at concentrations of 50 mM, 4 mM, and 4 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change of Electrochromic Display Element

The responsiveness to coloring of the produced EC display element was evaluated in the same manner as in Example 1.

Example 20

Preparation of Electrochromic Solution

In Mixed Solvent 1, HMIMTFSI, Compound A, and Compound B were dissolved at concentrations of 50 mM, 11 mM, and 11 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change of Electrochromic Display Element

The responsiveness to coloring of the produced EC display element was evaluated in the same manner as in Example 1.

Example 21

Preparation of Electrochromic Solution

In Mixed Solvent 2, HMIMTFSI, Compound A, and Compound B were dissolved at concentrations of 50 mM, 11 mM, and 11 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change of Electrochromic Display Element

The responsiveness to coloring of the produced EC display element was evaluated in the same manner as in Example 1.

Example 22

Preparation of Electrochromic Solution

In Mixed Solvent 3, HMIMTFSI, Compound A, and Compound B were dissolved at concentrations of 50 mM, 11 mM, and 11 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change of Electrochromic Display Element

The responsiveness to coloring of the produced EC display element was evaluated in the same manner as in Example 1.

Example 23

Preparation of Electrochromic Solution

In Mixed Solvent 4, 1-ethyl-3-methylimidazolium tetracyanoborate (EMIMTCB, manufactured by Merk KGaA), Compound E, and Compound B were dissolved at concentrations of 259 mM, 10.2 mM, and 13.5 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change of Electrochromic Display Element

The responsiveness to coloring of the produced EC display element was evaluated in the same manner as in Example 1.

Comparative Example 1

Preparation of Electrochromic Solution

In PhCN, TBAP, Compound E, and ferrocene (manufactured by Tokyo Chemical Industry Co., Ltd.) were dissolved at concentrations of 50 mM, 11 mM, and 11 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change of Electrochromic Display Element

The responsiveness to coloring of the produced EC display element was evaluated in the same manner as in Example 1.

Comparative Example 2

In PhCN, TBAP and Compound A were dissolved at concentrations of 50 mM and 11 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change of Electrochromic Display Element

The responsiveness to coloring of the produced EC display element was evaluated in the same manner as in Example 1.

Comparative Example 3

In PhCN, TBAP and Compound B were dissolved at concentrations of 50 mM and 11 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change of Electrochromic Display Element

The responsiveness to coloring of the produced EC display element was evaluated in the same manner as in Example 1.

Comparative Example 4

Preparation of Electrochromic Solution

In PhCN, HMIMTFSI, Compound A, and Compound C were dissolved at concentrations of 400 mM, 3 mM, and 3 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change of Electrochromic Display Element

The responsiveness to coloring of the produced EC display element was evaluated in the same manner as in Example 1.

Comparative Example 5

Preparation of Electrochromic Solution

In PhCN, HMIMTFSI, Compound A, and Compound C were dissolved at concentrations of 400 mM, 2 mM, and 2 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change of Electrochromic Display Element

The responsiveness to coloring of the produced EC display element was evaluated in the same manner as in Example 1.

Comparative Example 6

Preparation of Electrochromic Solution

In PhCN, HMIMTFSI, Compound A, and Compound C were dissolved at concentrations of 400 mM, 1 mM, and 1 mM, respectively. Thus, an EC solution was prepared.

Preparation of Electrochromic Display Element

An empty cell was prepared in the same manner as in Example 1. The EC solution was injected in the empty cell from the unsealed side, and the unsealed side was then sealed. Thus, an EC element was prepared.

Color Change of Electrochromic Display Element

The responsiveness to coloring of the produced EC display element was evaluated in the same manner as in Example 1.

TABLE 1

| No. | Solvent | Supporting Electrolyte | Cathodic EC Molecule | | Anodic EC Molecule | | Color Change Test |
|---|---|---|---|---|---|---|---|
| Example 1 | PhCN | HMIMTFSI | Compound A | 15 mM | Compound B | 15 mM | S |
| Example 2 | PhCN | HMIMTFSI | Compound A | 14 mM | Compound B | 14 mM | S |
| Example 3 | PhCN | HMIMTFSI | Compound A | 13 mM | Compound B | 13 mM | S |
| Example 4 | PhCN | HMIMTFSI | Compound A | 12 mM | Compound B | 12 mM | S |
| Example 5 | PhCN | HMIMTFSI | Compound A | 11 mM | Compound B | 11 mM | S |
| Example 6 | PhCN | HMIMTFSI | Compound A | 10 mM | Compound B | 10 mM | A |
| Example 7 | PhCN | HMIMTFSI | Compound A | 9 mM | Compound B | 9 mM | A |
| Example 8 | PhCN | HMIMTFSI | Compound A | 8 mM | Compound B | 8 mM | A |
| Example 9 | PhCN | HMIMTFSI | Compound A | 7 mM | Compound B | 7 mM | B |
| Example 10 | PhCN | HMIMTFSI | Compound A | 6 mM | Compound B | 6 mM | B |

TABLE 1-continued

| No. | Solvent | Supporting Electrolyte | Cathodic EC Molecule | | Anodic EC Molecule | | Color Change Test |
|---|---|---|---|---|---|---|---|
| Example 11 | PhCN | HMIMTFSI | Compound A | 5 mM | Compound B | 5 mM | B |
| Example 12 | PhCN | HMIMTFSI | Compound A | 4 mM | Compound B | 4 mM | B |
| Example 13 | PhCN | TBAP | Compound E | 11 mM | Compound C | 11 mM | B |
| Example 14 | PhCN | TBAP | Compound E | 4 mM | Compound C | 4 mM | S |
| Example 15 | PhCN | HMIMTFSI | Compound A | 11 mM | Compound D | 11 mM | S |
| Example 16 | DMA | HMIMTFSI | Compound A | 8 mM | Compound B | 8 mM | A |
| Example 17 | NMP | HMIMTFSI | Compound E | 11 mM | Compound C | 11 mM | S |
| Example 18 | NMP | HMIMTFSI | Compound E | 11 mM | Compound D | 11 mM | S |
| Example 19 | CHN | TBAP | Compound A | 4 mM | Compound C | 4 mM | B |
| Example 20 | Mixed Solvent 1 | HMIMTFSI | Compound A | 11 mM | Compound B | 11 mM | S |
| Example 21 | Mixed Solvent 2 | HMIMTFSI | Compound A | 11 mM | Compound B | 11 mM | S |
| Example 22 | Mixed Solvent 3 | HMIMTFSI | Compound A | 11 mM | Compound B | 11 mM | S |
| Example 23 | Mixed Solvent 4 | EMIMTCB | Compound E | 10.2 mM | Compound B | 13.5 mM | A |
| Comparative Example 1 | PhCN | TBAP | Compound E | 11 mM | Ferrocene | 11 mM | C |
| Comparative Example 2 | PhCN | TBAP | Compound A | 11 mM | — | — | C |
| Comparative Example 3 | PhCN | TBAP | — | — | Compound B | 11 mM | C |
| Comparative Example 4 | PhCN | HMIMTFSI | Compound A | 3 mM | Compound B | 3 mM | C |
| Comparative Example 5 | PhCN | HMIMTFSI | Compound A | 2 mM | Compound B | 2 mM | C |
| Comparative Example 6 | PhCN | HMIMTFSI | Compound A | 1 mM | Compound B | 1 mM | C |

As is clear from the Examples, the electrochromic display elements in which both the triarylamine derivative and the viologen derivative were dissolved at concentrations of 4 mM or more were evaluated as rank B or higher in the color change test, which means that they exhibited good coloring property, regardless of the types of the solvent and supporting electrolyte. In addition, the electrochromic display elements in which both the triarylamine derivative and the viologen derivative were dissolved at concentrations of 8 mM or more were evaluated as rank A, and the electrochromic display elements in which both the triarylamine derivative and the viologen derivative were dissolved at concentrations of 11 mM or more were evaluated as rank S. On the other hand, as is clear from Comparative Examples 1 to 3, the electrochromic display elements in which the triarylamine derivative or the viologen derivative was not dissolved were evaluated as rank C, in which almost no color change was confirmed. Even when both the triarylamine derivative and the viologen derivative were dissolved, the electrochromic display element was evaluated as rank C when the concentrations thereof were less than 4 mM.

Accordingly, the electrochromic display element having an electrochromic layer in which both the triarylamine derivative and the viologen derivative are dissolved at concentrations of 4 mM or more exhibits good coloring property.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An electrochromic display element comprising:
   a pair of electrodes; and
   an electrochromic layer disposed between the electrodes, the electrochromic layer containing:
      a solvent;
      a supporting electrolyte:
      an anodic electrochromic molecule comprising a triarylamine derivative; and
      a cathodic electrochromic molecule comprising a viologen derivative,
   wherein concentrations of the triarylamine derivative and the viologen derivative in the electrochromic layer are each 4 mM or more, and
   wherein the viologen derivative comprises a compound represented by the following general formula (5):

General Formula (5)

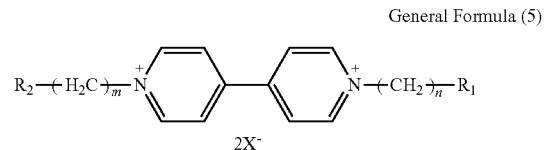

where each of $R_1$ and $R_2$ independently represents an alkyl or aryl group having 1 to 10 carbon atoms which may have a substituent; each of n and m independently represents 0 or an integer of from 1 to 10; and X represents a monovalent anion selected from the group consisting of $ClO_4$ ion ($ClO_4^-$), $PF_6$ ion ($PF_6^-$), $BF_4$ ion ($BF_4^-$), $CF_3SO_3$ ion ($OTf^-$), $(FSO_2)_2N$ ion ($FSI^-$), $(CF_3SO_2)_2N$ ion ($TFSI^-$), or $B(CN)_4$ ion ($TCB^-$).

2. The electrochromic display element according to claim wherein the concentrations of the triarylamine derivative and the viologen derivative in the electrochromic layer are each 8 mM or more.

3. The electrochromic display element according to claim 2, wherein the concentrations of the triarylamine derivative and the viologen derivative in the electrochromic layer are each 11 mM or more.

4. The electrochromic display element according to claim wherein the triarylamine derivative comprises a benzidine derivative.

5. The electrochromic display element according to claim 4, wherein the benzidine derivative comprises a compound represented by the following general formula (6):

General Formula (6)

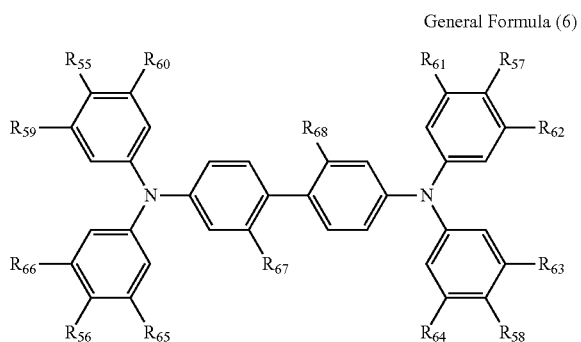

where each of $R_{55}$ to $R_{58}$ independently represents a halogen atom, an alkyl group, an alkoxy group, or a phenyl ether group; each of $R_{59}$ to $R_{66}$ independently represents a hydrogen atom, an alkyl group, or an alkoxy group; and each of $R_{67}$ and $R_{68}$ independently represents a hydrogen atom, a halogen atom, an alkyl group, or an alkoxy group, or $R_{67}$ and $R_{68}$ may be bonded with each other to form the following structure when each of $R_{67}$ and $R_{68}$ represents an alkyl group:

where each of $R_1$ and $R_2$ independently represents an alkyl group or an aryl group.

6. The electrochromic display element according to claim 1, wherein the triarylamine derivative comprises a compound represented by the following general formula (7):

General Formula (7)

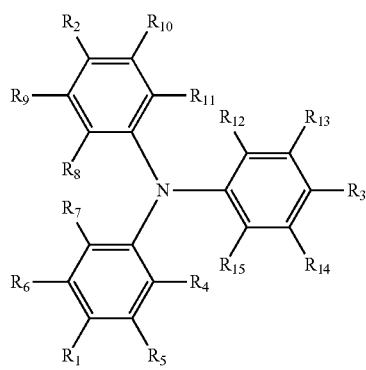

where each of $R_1$ to $R_3$ independently represents at least one member selected from the group consisting of a halogen atom, an alkyl group, an alkoxy group, a group in which an aryl group and a heterocyclic group are bonded via a covalent bond, and a group in which an aryl group and a heterocyclic group are ring-condensed; and each of $R_4$ to $R_{15}$ independently represents at least one member selected from the group consisting of a hydrogen atom, a halogen atom, an alkyl group, an alkoxy group, a group in which an aryl group and a heterocyclic group are bonded via a covalent bond, acid a group in which an aryl group and a heterocyclic group are ring-condensed.

7. The electrochromic display element according to claim 1, wherein the viologen derivative comprises a compound represented by one of the following structural formulae (4) to (7).

Structural Formula (4)

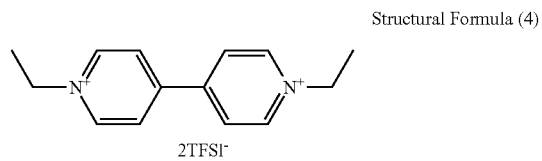

2TFSI⁻

Structural Formula (5)

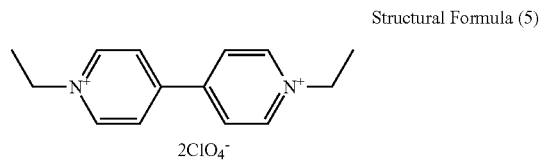

2ClO₄⁻

Structural Formula (6)

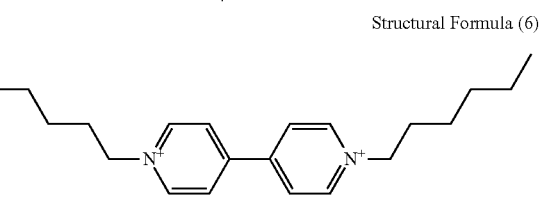

2ClO₄⁻

Structural Formula (7)

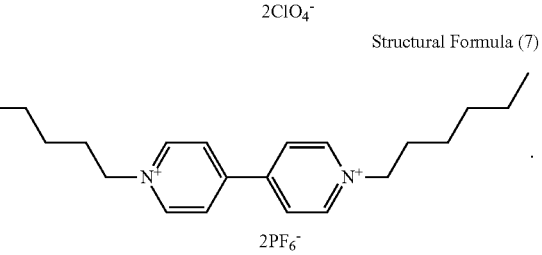

2PF₆⁻

8. The electrochromic display element according to claim 1, wherein the solvent comprises a benzonitrile derivative.

9. An optical filter comprising the electrochromic display element according to claim 1.

10. The optical filter according to claim 9, further comprising an active element coupled to the electrochromic display element.

11. A lens unit comprising the electrochromic display element according to claim 1.

12. An imaging device comprising:
an imaging optical system comprising an optical path; and
the electrochromic display element according to claim 1 disposed in the optical path.

* * * * *